(12) United States Patent
Hanson

(10) Patent No.: US 10,074,130 B2
(45) Date of Patent: Sep. 11, 2018

(54) GENERATING CUSTOMER ALERTS BASED ON INDOOR POSITIONING SYSTEM DETECTION OF PHYSICAL CUSTOMER PRESENCE

(71) Applicant: Bank of America Corporation, Charlotte, NC (US)

(72) Inventor: Carrie Anne Hanson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 361 days.

(21) Appl. No.: 14/327,570

(22) Filed: Jul. 10, 2014

(65) Prior Publication Data

US 2016/0012527 A1    Jan. 14, 2016

(51) Int. Cl.
| | | |
|---|---|---|
| *G06Q 40/00* | (2012.01) | |
| *G06Q 40/02* | (2012.01) | |
| *H04W 4/02* | (2018.01) | |
| *G06Q 20/10* | (2012.01) | |
| *G06Q 40/06* | (2012.01) | |
| *G06Q 40/04* | (2012.01) | |

(52) U.S. Cl.
CPC ............ *G06Q 40/02* (2013.01); *G06Q 20/10* (2013.01); *G06Q 40/00* (2013.01); *G06Q 40/04* (2013.01); *G06Q 40/06* (2013.01); *H04W 4/02* (2013.01)

(58) Field of Classification Search
CPC ........ G06Q 40/00; G06Q 40/02; G06Q 40/04; G06Q 40/06; G06Q 20/10
USPC ........................................................ 705/35
See application file for complete search history.

(56) References Cited

U.S. PATENT DOCUMENTS

| | | | |
|---|---|---|---|
| 3,808,410 A | 4/1974 | Schlesinger | |
| 4,700,295 A | 10/1987 | Katsof et al. | |
| 5,581,625 A | 12/1996 | Connell | |
| 5,581,630 A | 12/1996 | Bonneau, Jr. | |
| 5,953,055 A | 9/1999 | Huang et al. | |

(Continued)

FOREIGN PATENT DOCUMENTS

KR    20090050383 A    5/2009

OTHER PUBLICATIONS

Adam Silverman, Title: The Emergence of Beacons n Retail, Mar. 12, 2014, Forrester Research, Inc—Cambridge, MA, pp. 1-13.*

(Continued)

*Primary Examiner* — Kito R Robinson
*Assistant Examiner* — Benjamin Brindley
(74) *Attorney, Agent, or Firm* — Banner & Witcoff, Ltd.; Michael A. Springs

(57) ABSTRACT

A computing platform may receive a plurality of messages comprising data indicating physical presence of customers of a financial institution at a physical banking center location of the financial institution from an indoor positioning system located at the physical banking center location of the financial institution. Responsive to receiving the plurality of messages comprising the data indicating the physical presence of the customers of the financial institution at the physical banking center location of the financial institution, the computing platform may determine that at least one customer of the customers of the financial institution at the physical banking center location of the financial institution has flagged one or more items via an online-banking system of the financial institution.

14 Claims, 8 Drawing Sheets

(56) References Cited

U.S. PATENT DOCUMENTS

| | | | |
|---|---|---|---|
| 5,991,749 | A | 11/1999 | Morrill, Jr. |
| 6,513,015 | B2 | 1/2003 | Ogasawara |
| 6,563,423 | B2 | 5/2003 | Smith |
| 6,593,856 | B1 | 7/2003 | Madau |
| 6,624,739 | B1 | 9/2003 | Stobbe |
| 6,738,628 | B1 | 5/2004 | McCall et al. |
| 6,845,361 | B1 | 1/2005 | Dowling |
| 7,047,560 | B2 | 5/2006 | Fishman et al. |
| 7,111,174 | B2 | 9/2006 | Hamid |
| 7,149,533 | B2 | 12/2006 | Laird et al. |
| 7,181,252 | B2 | 2/2007 | Komsi |
| 7,357,316 | B2 | 4/2008 | Heckel et al. |
| 7,466,224 | B2 | 12/2008 | Ward et al. |
| 7,490,122 | B2 | 2/2009 | Horvitz et al. |
| 7,536,316 | B2 | 5/2009 | Ozer et al. |
| 7,536,722 | B1 | 5/2009 | Saltz et al. |
| 7,543,738 | B1 | 6/2009 | Saunders et al. |
| 7,552,800 | B2 | 6/2009 | Puskala et al. |
| 7,712,657 | B1 | 5/2010 | Block et al. |
| 7,774,076 | B2 | 8/2010 | Skowronek |
| 7,778,855 | B2 | 8/2010 | Holliday |
| 7,814,016 | B2 | 10/2010 | Pranger |
| 7,904,718 | B2 | 3/2011 | Giobbi et al. |
| 7,911,334 | B2 | 3/2011 | Busey |
| 7,912,843 | B2 | 3/2011 | Murdock et al. |
| 7,962,361 | B2 | 6/2011 | Ramchandani et al. |
| 7,969,285 | B2 | 6/2011 | Bauchot et al. |
| 7,979,899 | B2 | 7/2011 | Guo et al. |
| 8,009,013 | B1 | 8/2011 | Hirschfeld et al. |
| 8,055,551 | B2 | 11/2011 | Milgramm et al. |
| 8,073,460 | B1 | 12/2011 | Scofield et al. |
| 8,078,146 | B2 | 12/2011 | Jayappa et al. |
| 8,091,778 | B1 | 1/2012 | Block et al. |
| 8,093,988 | B2 | 1/2012 | Takene et al. |
| 8,145,649 | B2 | 3/2012 | Murdock et al. |
| 8,186,578 | B1 | 5/2012 | Block et al. |
| 8,201,729 | B1 | 6/2012 | Block et al. |
| 8,229,787 | B2 * | 7/2012 | Ramchandani ........ G06Q 30/02 705/14.23 |
| 8,232,860 | B2 | 7/2012 | Goel |
| 8,254,414 | B2 * | 8/2012 | Sakoda ............ H04W 72/1242 370/510 |
| 8,259,692 | B2 | 9/2012 | Bajko |
| 8,260,707 | B2 | 9/2012 | Treadwell et al. |
| 8,295,898 | B2 | 10/2012 | Ashfield et al. |
| 8,332,232 | B2 | 12/2012 | Nickerson et al. |
| 8,350,700 | B2 | 1/2013 | Fast et al. |
| 8,369,266 | B2 | 2/2013 | Jin et al. |
| 8,401,897 | B1 | 3/2013 | Chatterjee |
| 8,413,209 | B2 | 4/2013 | Aldera et al. |
| 8,413,891 | B2 | 4/2013 | Long |
| 8,467,768 | B2 | 6/2013 | Mahaffey et al. |
| 8,527,575 | B2 | 9/2013 | Xiao et al. |
| 8,543,828 | B2 | 9/2013 | Albisu |
| 8,558,759 | B1 | 10/2013 | Prada Gomez et al. |
| 8,583,933 | B2 | 11/2013 | Granbery |
| 8,590,028 | B2 | 11/2013 | Saxena et al. |
| 8,606,712 | B2 | 12/2013 | Choudhuri et al. |
| 8,627,422 | B2 | 1/2014 | Hawkes et al. |
| 8,640,946 | B1 | 2/2014 | Block et al. |
| 8,666,821 | B2 | 3/2014 | Kie et al. |
| 8,666,895 | B2 | 3/2014 | Grigg et al. |
| 8,671,001 | B1 | 3/2014 | Thompson et al. |
| 8,742,894 | B2 | 6/2014 | Seydoux |
| 9,166,967 | B2 | 10/2015 | Berkovitz et al. |
| 9,204,251 | B1 | 12/2015 | Mendelson |
| 9,204,257 | B1 | 12/2015 | Mendelson |
| 9,264,151 | B1 | 2/2016 | Emigh et al. |
| 9,265,450 | B1 | 2/2016 | Giobbi |
| 9,317,672 | B2 | 4/2016 | Carlson |
| 9,365,393 | B2 | 6/2016 | Salmikuukka et al. |
| 9,367,978 | B2 | 6/2016 | Sullivan |
| 9,380,417 | B1 | 6/2016 | Boyle et al. |
| 9,454,736 | B2 | 9/2016 | Reuveni et al. |
| 9,538,332 | B1 | 1/2017 | Mendelson |
| 2002/0035541 | A1 | 3/2002 | Makino et al. |
| 2002/0128850 | A1 | 9/2002 | Chen et al. |
| 2003/0107649 | A1 | 6/2003 | Flickner et al. |
| 2003/0125998 | A1 | 7/2003 | McKenney et al. |
| 2003/0200140 | A1 | 10/2003 | Hars |
| 2003/0200489 | A1 | 10/2003 | Hars |
| 2004/0093265 | A1 | 5/2004 | Ramchandani et al. |
| 2004/0093268 | A1 | 5/2004 | Ramchandani et al. |
| 2004/0153368 | A1 | 8/2004 | Freishtat et al. |
| 2006/0119469 | A1 | 6/2006 | Hirai et al. |
| 2006/0163349 | A1 | 7/2006 | Neugebauer |
| 2007/0042748 | A1 | 2/2007 | MacArthur |
| 2007/0127693 | A1 | 6/2007 | D'Ambrosio et al. |
| 2007/0186258 | A1 | 8/2007 | Dapper et al. |
| 2007/0186261 | A1 | 8/2007 | Geile et al. |
| 2007/0192815 | A1 | 8/2007 | Geile et al. |
| 2007/0195689 | A1 | 8/2007 | Dapper et al. |
| 2007/0195901 | A1 | 8/2007 | Geile et al. |
| 2007/0195902 | A1 | 8/2007 | Geile et al. |
| 2007/0201573 | A1 | 8/2007 | Geile et al. |
| 2007/0206693 | A1 | 9/2007 | Geile et al. |
| 2007/0253595 | A1 | 11/2007 | Sorensen |
| 2007/0262134 | A1 | 11/2007 | Humphrey et al. |
| 2007/0297589 | A1 | 12/2007 | Greischar et al. |
| 2008/0046285 | A1 | 2/2008 | Greischar et al. |
| 2008/0052151 | A1 | 2/2008 | Xie et al. |
| 2008/0067244 | A1 | 3/2008 | Marks |
| 2008/0097769 | A1 | 4/2008 | Galvin et al. |
| 2008/0114697 | A1 | 5/2008 | Black et al. |
| 2008/0150678 | A1 | 6/2008 | Giobbi et al. |
| 2008/0249857 | A1 | 10/2008 | Angell et al. |
| 2008/0255929 | A1 | 10/2008 | Mouton |
| 2008/0312998 | A1 | 12/2008 | Templeton et al. |
| 2009/0037306 | A1 | 2/2009 | Hill |
| 2009/0076875 | A1 | 3/2009 | Lert, Jr. et al. |
| 2009/0241175 | A1 | 9/2009 | Trandal et al. |
| 2009/0252318 | A1 | 10/2009 | Smith et al. |
| 2009/0259499 | A1 | 10/2009 | Bhojwani et al. |
| 2009/0325629 | A1 | 12/2009 | Snyder |
| 2009/0328052 | A1 | 12/2009 | Nguyen et al. |
| 2009/0328182 | A1 | 12/2009 | Malakapalli et al. |
| 2010/0017874 | A1 | 1/2010 | Piccinini et al. |
| 2010/0042541 | A1 | 2/2010 | Kang et al. |
| 2010/0161433 | A1 | 6/2010 | White |
| 2010/0191581 | A1 | 7/2010 | Furin et al. |
| 2010/0198725 | A1 | 8/2010 | Naccache |
| 2010/0205063 | A1 | 8/2010 | Mersky |
| 2010/0277276 | A1 | 11/2010 | Bayne et al. |
| 2010/0287250 | A1 * | 11/2010 | Carlson ................ G06Q 30/02 709/206 |
| 2011/0028160 | A1 | 2/2011 | Roeding et al. |
| 2011/0029359 | A1 | 2/2011 | Roeding et al. |
| 2011/0029370 | A1 | 2/2011 | Roeding et al. |
| 2011/0078279 | A1 | 3/2011 | Grecco et al. |
| 2011/0086646 | A1 | 4/2011 | Gupta et al. |
| 2011/0178862 | A1 | 7/2011 | Daigle |
| 2011/0178863 | A1 | 7/2011 | Daigle |
| 2011/0191242 | A1 | 8/2011 | Allen |
| 2011/0202377 | A1 | 8/2011 | Maiya et al. |
| 2011/0208657 | A1 | 8/2011 | Rao |
| 2011/0213709 | A1 | 9/2011 | Newman et al. |
| 2011/0223895 | A1 | 9/2011 | Wagda et al. |
| 2011/0238499 | A1 * | 9/2011 | Blackhurst ......... G06Q 30/0255 705/14.53 |
| 2011/0246306 | A1 | 10/2011 | Blackhurst et al. |
| 2011/0270618 | A1 | 11/2011 | Banerjee et al. |
| 2011/0313804 | A1 | 12/2011 | Camp et al. |
| 2011/0321031 | A1 | 12/2011 | Dournov et al. |
| 2012/0004769 | A1 | 1/2012 | Hallenbeck et al. |
| 2012/0047072 | A1 | 2/2012 | Larkin |
| 2012/0070041 | A1 | 3/2012 | Wang |
| 2012/0076183 | A1 | 3/2012 | Dapper et al. |
| 2012/0078673 | A1 | 3/2012 | Koke et al. |
| 2012/0078741 | A1 | 3/2012 | DeLine |
| 2012/0116929 | A1 | 5/2012 | Gventer et al. |
| 2012/0130840 | A1 | 5/2012 | Carlier et al. |
| 2012/0136479 | A1 | 5/2012 | Signorelli et al. |
| 2012/0143755 | A1 * | 6/2012 | Burrell .................. G06Q 20/10 705/43 |

(56) References Cited

U.S. PATENT DOCUMENTS

| | | |
|---|---|---|
| 2012/0158297 A1 | 6/2012 | Kim et al. |
| 2012/0185400 A1* | 7/2012 | Eubanks, Jr. ......... G06Q 30/016 705/304 |
| 2012/0195184 A1 | 8/2012 | Dapper et al. |
| 2012/0197773 A1 | 8/2012 | Grigg et al. |
| 2012/0197797 A1 | 8/2012 | Grigg et al. |
| 2012/0197798 A1 | 8/2012 | Grigg et al. |
| 2012/0203892 A1 | 8/2012 | Pignataro et al. |
| 2012/0265622 A1 | 10/2012 | Ramchandani |
| 2012/0271692 A1 | 10/2012 | Huang et al. |
| 2012/0278115 A1 | 11/2012 | Acharya et al. |
| 2012/0278234 A1 | 11/2012 | Dent et al. |
| 2012/0320199 A1 | 12/2012 | Kundu et al. |
| 2012/0320214 A1 | 12/2012 | Kundu et al. |
| 2012/0321146 A1 | 12/2012 | Kundu et al. |
| 2012/0323642 A1 | 12/2012 | Camp et al. |
| 2013/0005253 A1 | 1/2013 | Grigg et al. |
| 2013/0005443 A1 | 1/2013 | Kosta et al. |
| 2013/0024300 A1 | 1/2013 | Choudhuri et al. |
| 2013/0027561 A1 | 1/2013 | Lee et al. |
| 2013/0030915 A1* | 1/2013 | Statler .................... G06Q 30/02 705/14.54 |
| 2013/0041797 A1 | 2/2013 | Geeslin et al. |
| 2013/0045758 A1 | 2/2013 | Khorashadi et al. |
| 2013/0048724 A1 | 2/2013 | Burnside et al. |
| 2013/0104214 A1 | 4/2013 | Beck et al. |
| 2013/0121131 A1 | 5/2013 | Dapper et al. |
| 2013/0138497 A1 | 5/2013 | Yan et al. |
| 2013/0150006 A1 | 6/2013 | Nunally et al. |
| 2013/0159195 A1 | 6/2013 | Kirillin et al. |
| 2013/0165154 A1 | 6/2013 | Joshi |
| 2013/0173315 A1* | 7/2013 | Dorsey ............. G06F 17/30035 705/5 |
| 2013/0173387 A1 | 7/2013 | Adelaar |
| 2013/0173404 A1 | 7/2013 | Scipioni |
| 2013/0173492 A1 | 7/2013 | Leavenworth et al. |
| 2013/0182114 A1 | 7/2013 | Zhang et al. |
| 2013/0182904 A1 | 7/2013 | Zhang et al. |
| 2013/0198039 A1 | 8/2013 | Sridharan et al. |
| 2013/0203383 A1 | 8/2013 | Stopel et al. |
| 2013/0203439 A1 | 8/2013 | Lifshitz et al. |
| 2013/0211718 A1 | 8/2013 | Yoo et al. |
| 2013/0217416 A1 | 8/2013 | Matthews, III et al. |
| 2013/0238497 A1 | 9/2013 | Ramachandran et al. |
| 2013/0246301 A1 | 9/2013 | Radhakrishnan et al. |
| 2013/0253818 A1 | 9/2013 | Sanders et al. |
| 2013/0261964 A1 | 10/2013 | Goldman et al. |
| 2013/0268378 A1 | 10/2013 | Yovin |
| 2013/0275163 A1 | 10/2013 | Kaiser |
| 2013/0281084 A1 | 10/2013 | Batada et al. |
| 2013/0282589 A1 | 10/2013 | Shoup et al. |
| 2013/0282744 A1 | 10/2013 | Hartman et al. |
| 2013/0297422 A1 | 11/2013 | Hunter et al. |
| 2013/0300541 A1 | 11/2013 | Pesonen et al. |
| 2013/0310081 A1 | 11/2013 | Chu |
| 2013/0317778 A1 | 11/2013 | Gupta et al. |
| 2013/0325587 A1 | 12/2013 | Kothari et al. |
| 2013/0328725 A1 | 12/2013 | Wuoti et al. |
| 2013/0332271 A1 | 12/2013 | Hay |
| 2013/0332273 A1 | 12/2013 | Gu et al. |
| 2013/0346189 A1 | 12/2013 | Isaacs |
| 2014/0006219 A1 | 1/2014 | Wouhaybi et al. |
| 2014/0020073 A1 | 1/2014 | Ronda et al. |
| 2014/0032297 A1 | 1/2014 | Germann et al. |
| 2014/0032345 A1 | 1/2014 | Moore |
| 2014/0039950 A1 | 2/2014 | Appel et al. |
| 2014/0039951 A1 | 2/2014 | Appel et al. |
| 2014/0046718 A1 | 2/2014 | Schiller |
| 2014/0046830 A1 | 2/2014 | Orozco et al. |
| 2014/0052645 A1* | 2/2014 | Hawes ..................... G06Q 10/20 705/304 |
| 2014/0058914 A1 | 2/2014 | Song et al. |
| 2014/0068785 A1 | 3/2014 | Gventer et al. |
| 2014/0074800 A1 | 3/2014 | Gventer et al. |
| 2014/0081858 A1 | 3/2014 | Block et al. |
| 2014/0105263 A1 | 4/2014 | Geile |
| 2014/0110481 A1 | 4/2014 | Burnside et al. |
| 2014/0114877 A1 | 4/2014 | Montano |
| 2014/0129441 A1 | 5/2014 | Blanco et al. |
| 2014/0149293 A1 | 5/2014 | Laracey |
| 2014/0162598 A1 | 6/2014 | Villa-Real |
| 2014/0188733 A1 | 7/2014 | Granbery |
| 2014/0201025 A1 | 7/2014 | Adoni et al. |
| 2014/0222603 A1 | 8/2014 | Hay |
| 2014/0258028 A1 | 9/2014 | Bynum et al. |
| 2014/0270108 A1 | 9/2014 | Riahi et al. |
| 2014/0270109 A1 | 9/2014 | Riahi et al. |
| 2014/0270146 A1 | 9/2014 | Riahi et al. |
| 2014/0279009 A1 | 9/2014 | Grigg et al. |
| 2014/0279450 A1 | 9/2014 | Gujral |
| 2014/0280316 A1 | 9/2014 | Ganick et al. |
| 2014/0289032 A1 | 9/2014 | Muto et al. |
| 2014/0297527 A1 | 10/2014 | McLaughlin et al. |
| 2014/0309770 A1 | 10/2014 | Signorelli et al. |
| 2014/0365255 A1 | 12/2014 | Burgess et al. |
| 2014/0365334 A1 | 12/2014 | Hurewitz |
| 2015/0006213 A1 | 1/2015 | Heier |
| 2015/0018011 A1 | 1/2015 | Mendelson |
| 2015/0051976 A1 | 2/2015 | Brown et al. |
| 2015/0058159 A1 | 2/2015 | Balram et al. |
| 2015/0059002 A1 | 2/2015 | Balram et al. |
| 2015/0072618 A1 | 3/2015 | Granbery |
| 2015/0073980 A1 | 3/2015 | Griffin et al. |
| 2015/0081492 A1 | 3/2015 | Brereton et al. |
| 2015/0089585 A1 | 3/2015 | Novack |
| 2015/0126119 A1 | 5/2015 | Schulz et al. |
| 2015/0140982 A1* | 5/2015 | Postrel .................... H04W 4/12 455/418 |
| 2015/0235161 A1 | 8/2015 | Azar et al. |
| 2015/0278829 A1 | 10/2015 | Lu et al. |
| 2015/0278888 A1 | 10/2015 | Lu et al. |
| 2015/0287014 A1 | 10/2015 | Granbery |
| 2015/0289111 A1 | 10/2015 | Ozkan |
| 2015/0302469 A1 | 10/2015 | Billou |
| 2015/0382137 A1 | 12/2015 | Prehn et al. |
| 2016/0007157 A1 | 1/2016 | Tipton et al. |
| 2016/0277560 A1 | 9/2016 | Gruberman et al. |
| 2016/0335686 A1 | 11/2016 | AthuluruTlrumala et al. |
| 2017/0039616 A1 | 2/2017 | Korra et al. |

OTHER PUBLICATIONS

Statement RE: Related Applications dated Jul. 10, 2015.

Zibreg, Christian, "Apple Releases iBeacon Specification", Feb. 25, 2014, iDB, idownloadblog.com.

Cisco, "iBeacon—Frequently Asked Questions", Mar. 24, 2014, Cisco Public (Year: 2014).

Charlton, Graham, "Five Examples of How Marketers Are Using iBeacons", Apr. 7, 2014, Econsultancy (Year: 2014).

Newman, Nic, "Apple iBeacon Technology Briefing", Jan. 17, 2014, MacMillan Publishers Ltd., Journal of Direct, Data and Marketing Practice (2014) 15, 222-225. doi:10.1057/dddmp.2014.7 (Year 2014).

DMI, "Beacon Technology: What's in It for Retailers", 2014, DMI Mobile Enterprise Solutions (Year: 2014).

Smith, Paul, "Google Glass and Apple's iBeacon on the Way to a Bank Near You", Feb. 4, 2014, Financial Review (Year: 2014).

Kar, Ian, "LevelUp Syncs With iBeacon to Connect with Customers Earlier", Jun. 14, 2014, Bank Innovation (Year 2014).

Silverman, Adam, "The Emergence of Beacons in Retail", Mar. 12, 2014, Forrester Research, Inc. (Year: 2014).

"iBeacon: You Can Take It to the Bank", Mar. 1, 2014, Before It's News (Year 2014).

Clancy, Heather, "Apple's iBeacon Signals Turning Point for Mobile Engagement", Mar. 1, 2014, Fortune (Year 2014).

Crosman, Penny, "Q&A with Westpac's Digital Chief on Wearable Computing, iBeacon", Feb. 19, 2014, American Banker (Year: 2014).

Apple, Inc., "Getting Started with iBeacon" Verson 1.0, Jun. 2, 2014, Apple, Inc. (Year: 2014).

(56) References Cited

OTHER PUBLICATIONS

Swedberg, Claire, "Yes Bank Uses RFID to Personalize Service", Oct. 13, 2008, RFID Journal, <http://www.rfidjournal.com/articles/view?4381 >, 2 pages.

Marous, Jim, "10 Ways iBeacon Can Improve Banking Sales & Service", Mar. 31, 2014, The Financial Brand, retrieved from https://thefinancialbrand.com/38160/ibeacon-bank-branch-mobile-cross-selling/, 4 pages.

Berry, John, "How to Create an In-Branch Mobile Experience", Feb. 7, 2014, American Banker, retrieved from https://www.americanbanker.com/opinion/how-to-create-an-in-branch-mobile-experience, 3 pages.

Howden, Ben, "How banks can innovate using Apple's iBeacon", Feb. 23, 2014, Lighthouse.io Blog, retrieved from http://blog.lighthouse.io/banks-can-innovate-using-apples-ibeacon/, 3 pages.

Bender, Adam, "St. George Bank pings branch customers with iBeacon", May 13, 2014, Computerworld, retrieved from https://www.computerworld.com.au/article/621055/acma-mulls-5g-future-3-6ghz-spectrum, 2 pages.

Foo, Fran, "St. George getting to know your iface," May 13, 2014, The Australian, retrieved from http://www.theaustralian.com.au/business/technology/st-george-getting-to-know-your-iface/news-story/eab43c5797329c4fb70a94418416eeca, 3 pages.

Quora, "What do you think are the biggest problems of iBeacons?", <https://www.quora.com/What-do-you-think-are-the-biggest-problems-of-iBeacons>, Jun. 23, 2016.

Wisniewski, Mary, "Tellers Become Guides and Storytellers in High-Tech Branches"; Apr. 14, 2014; American Banker, vol. 178, Issue 56, p. 29-29., 1p.

\* cited by examiner

GENERATING CUSTOMER ALERTS BASED ON INDOOR POSITIONING SYSTEM DETECTION OF PHYSICAL CUSTOMER PRESENCE

BACKGROUND

Many organizations interact with their customers via online systems. Occasionally, customers may encounter items via an organization's online systems that the customers would like to discuss with a representative of the organization. One of the most effective means of addressing such items is the in-person context, where customers are physically present at a location of the organization and interact with representatives of the organization. Often, however, a customer will have forgotten about such an item by the time they find themselves at a location of the organization, for example, because the customer may be at the location in connection with an unrelated transaction, or the like. Accordingly, a need exists for generating customer alerts based on indoor positioning system detection of physical customer presence.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing platform may receive a plurality of messages comprising data indicating physical presence of customers of a financial institution at a physical banking center location of the financial institution from an indoor positioning system located at the physical banking center location of the financial institution. Responsive to receiving the plurality of messages comprising the data indicating the physical presence of the customers of the financial institution at the physical banking center location of the financial institution, the computing platform may determine that at least one customer of the customers of the financial institution at the physical banking center location of the financial institution has flagged one or more items via an online-banking system of the financial institution.

In some embodiments, the computing platform may generate a message indicating that the at least one customer of the customers of the financial institution at the physical banking center location of the financial institution has flagged the one or more items via the online-banking system of the financial institution. In such embodiments, the computing platform may identify at least one computing device located at the physical banking center location of the financial institution, and may communicate the message indicating that the at least one customer of the customers of the financial institution at the physical banking center location of the financial institution has flagged the one or more items via the online-banking system of the financial institution to the at least one computing device located at the physical banking center location of the financial institution.

In some embodiments, the computing platform may receive one or more messages comprising data identifying a plurality of customers of the financial institution that have flagged items via the online-banking system of the financial institution, and one or more items that the customers of the financial institution have flagged via the online-banking system of the financial institution, from the online-banking system of the financial institution. In such embodiments, the computing platform may generate one or more records comprising the data identifying the plurality of customers of the financial institution that have flagged items via the online-banking system of the financial institution, and the one or more items that the customers of the financial institution have flagged via the online-banking system of the financial institution. The computing platform may store the one or more records comprising the data identifying the plurality of customers of the financial institution that have flagged items via the online-banking system of the financial institution, and the one or more items that the customers of the financial institution have flagged via the online-banking system of the financial institution, in a memory of the computing platform.

In some embodiments, determining that the at least one customer of the customers of the financial institution at the physical banking center location of the financial institution has flagged one or more items via the online-banking system of the financial institution may include identifying, from amongst the plurality of customers of the financial institution that have flagged items via the online-banking system of the financial institution, the at least one customer of the customers of the financial institution at the physical banking center location of the financial institution, and identifying, from amongst the one or more items that the customers of the financial institution have flagged via the online-banking system of the financial institution, one or more items that the at least one customer of the customers of the financial institution at the physical banking center location of the financial institution has flagged via the online-banking system of the financial institution.

In some embodiments, the computing platform may identify one or more personal computing devices presently in possession of the at least one customer of the customers of the financial institution at the physical banking center location of the financial institution based on at least one of the plurality of messages comprising the data indicating the physical presence of the customers of the financial institution at the physical banking center location of the financial institution. In such embodiments, the computing platform may generate one or more messages indicating that the at least one customer of the customers of the financial institution at the physical banking center location of the financial institution has flagged the one or more items via the online-banking system of the financial institution, and may communicate the one or more messages indicating that the at least one customer of the customers of the financial institution at the physical banking center location of the financial institution has flagged the one or more items via the online-banking system of the financial institution to the one or more personal computing devices presently in possession of the at least one customer of the customers of the financial institution at the physical banking center location of the financial institution.

In some embodiments, the computing platform may receive a plurality of messages comprising data indicating physical presence of associates of the financial institution at the physical banking center location of the financial institution from the indoor positioning system located at the physical banking center location of the financial institution. The computing platform may identify one or more associates of the associates of the financial institution at the physical banking center location of the financial institution to assist that at least one customer of the customers of the financial institution at the physical banking center location of the financial institution based on the data indicating the physical presence of the associates of the financial institution at the physical banking center location of the financial institution. The computing platform may identify one or more personal computing devices presently in possession of the one or more associates of the associates of the financial institution at the physical banking center location of the financial institution based on at least one of the plurality of messages comprising the data indicating the physical presence of the associates of the financial institution at the physical banking center location of the financial institution. The computing platform may generate one or more messages indicating that the at least one customer of the customers of the financial institution at the physical banking center location of the financial institution has flagged the one or more items via the online-banking system of the financial institution, and may communicate the one or more messages indicating that the at least one customer of the customers of the financial institution at the physical banking center location of the financial institution has flagged the one or more items via the online-banking system of the financial institution to the one or more personal computing devices presently in possession of the one or more associates of the associates of the financial institution at the physical banking center location of the financial institution.

In some embodiments, the one or more items may include one or more fees incurred with the financial institution by the at least one customer of the customers of the financial institution at the physical banking center location of the financial institution that the at least one customer of the customers of the financial institution at the physical banking center location of the financial institution has flagged via the online-banking system of the financial institution. In such embodiments, determining that the at least one customer of the customers of the financial institution at the physical banking center location of the financial institution has flagged the one or more items via the online-banking system of the financial institution may include determining that the at least one customer of the customers of the financial institution at the physical banking center location of the financial institution has flagged the one or more fees incurred with the financial institution by the at least one customer of the customers of the financial institution at the physical banking center location of the financial institution via the online-banking system of the financial institution.

In some embodiments, the one or more items may include one or more offers the financial institution has presented to the at least one customer of the customers of the financial institution at the physical banking center location of the financial institution that the at least one customer of the customers of the financial institution at the physical banking center location of the financial institution has flagged via the online-banking system of the financial institution. In such embodiments, determining that the at least one customer of the customers of the financial institution at the physical banking center location of the financial institution has flagged the one or more items via the online-banking system of the financial institution may include determining that the at least one customer of the customers of the financial institution at the physical banking center location of the financial institution has flagged the one or more offers the financial institution has presented to the at least one customer of the customers of the financial institution at the physical banking center location of the financial institution via the online-banking system of the financial institution.

In some embodiments, the plurality of messages comprising data indicating the physical presence of the customers of the financial institution at the physical banking center location of the financial institution may include a plurality of customer identifiers. Each customer identifier of the plurality of customer identifiers may identify a customer of the customers of the financial institution at the physical banking center location of the financial institution. In such embodiments, determining that the at least one customer of the customers of the financial institution at the physical banking center location of the financial institution has flagged the one or more items via the online-banking system of the financial institution may include determining that the at least one customer of the customers of the financial institution at the physical banking center location of the financial institution has flagged one or more items via the online-banking system of the financial institution based on at least one of the plurality of customer identifiers that corresponds to the at least one customer of the customers of the financial institution at the physical banking center location of the financial institution.

In some embodiments, the indoor positioning system may include a plurality of personal computing devices presently in possession of the customers of the financial institution at the physical banking center location of the financial institution, and at least one location beacon that is located at the physical banking center location of the financial institution and configured to emit a signal comprising an identifier associated with the physical banking center location. In such embodiments, receiving the plurality of messages comprising data indicating the physical presence of the customers of the financial institution at the physical banking center location of the financial institution may include receiving data comprising the identifier associated with the physical banking center location from the plurality of personal computing devices.

In some embodiments, the indoor positioning system may include a location beacon that is located at a first location of the physical banking center location of the financial institution and configured to emit a signal comprising an identifier associated with the first location of the physical banking center location of the financial institution, and a location beacon that is located at a second location of the physical banking center location of the financial institution and configured to emit a signal comprising an identifier associated with the second location of the physical banking center location of the financial institution. In such embodiments, receiving the plurality of messages comprising data indicating physical presence of the customers of the financial institution at the physical banking center location of the financial institution may include receiving messages comprising data indicating physical presence of a portion of the customers of the financial institution at the first location of the physical banking center location of the financial institution, and receiving messages comprising data indicating physical presence of a portion of the customers of the financial institution at the second location of the physical banking center location of the financial institution.

In some embodiments, determining that the at least one customer of the customers of the financial institution at the physical banking center location of the financial institution has flagged the one or more items via the online-banking system of the financial institution may include determining that a customer of the portion of the customers of the financial institution at the first location of the physical banking center location of the financial institution has flagged one or more items via the online-banking system of the financial institution, and determining that a customer of the portion of the customers of the financial institution at the second location of the physical banking center location of the financial institution has flagged one or more items via the online-banking system of the financial institution.

In some embodiments, the computing platform may generate a message indicating that the customer of the portion of the customers of the financial institution at the first location of the physical banking center location of the financial institution has flagged one or more items via the online-banking system of the financial institution, and a message indicating that the customer of the portion of the customers of the financial institution at the second location of the physical banking center location of the financial institution has flagged one or more items via the online-banking system of the financial institution.

In some embodiments, the computing platform may identify a personal computing device presently in possession of the customer of the portion of the customers of the financial institution at the first location of the physical banking center location of the financial institution based on the messages comprising data indicating physical presence of the portion of the customers of the financial institution at the first location of the physical banking center location of the financial institution, and a personal computing device presently in possession of the customer of the portion of the customers of the financial institution at the second location of the physical banking center location of the financial institution based on the messages comprising data indicating physical presence of the portion of the customers of the financial institution at the second location of the physical banking center location of the financial institution. In such embodiments, the computing platform may communicate the message indicating that the customer of the portion of the customers of the financial institution at the first location of the physical banking center location of the financial institution has flagged one or more items via the online-banking system of the financial institution to the personal computing device presently in possession of the customer of the portion of the customers of the financial institution at the first location of the physical banking center location of the financial institution, and may communicate the message indicating that the customer of the portion of the customers of the financial institution at the second location of the physical banking center location of the financial institution has flagged one or more items via the online-banking system of the financial institution to the personal computing device presently in possession of the customer of the portion of the customers of the financial institution at the second location of the physical banking center location of the financial institution.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
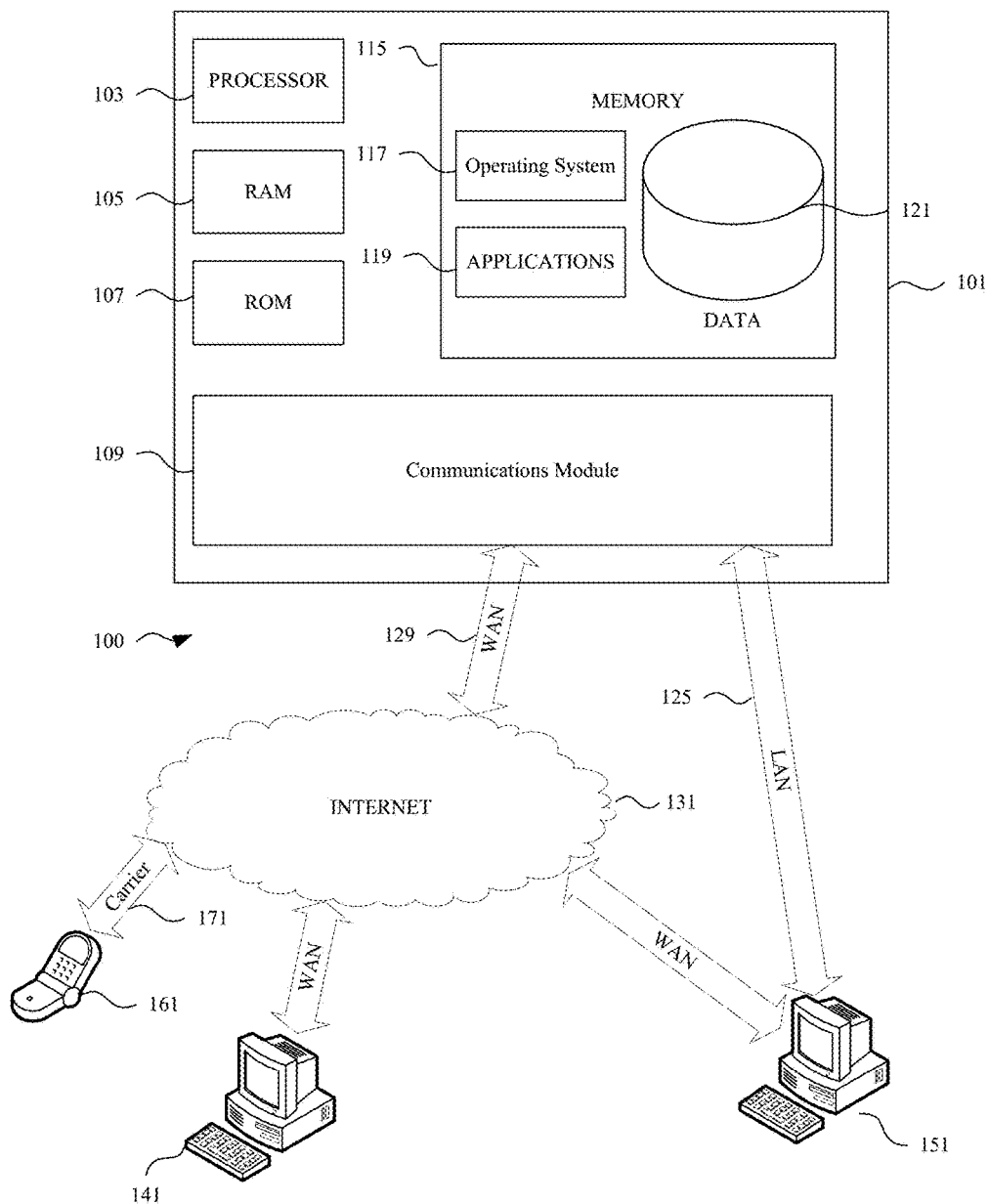
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
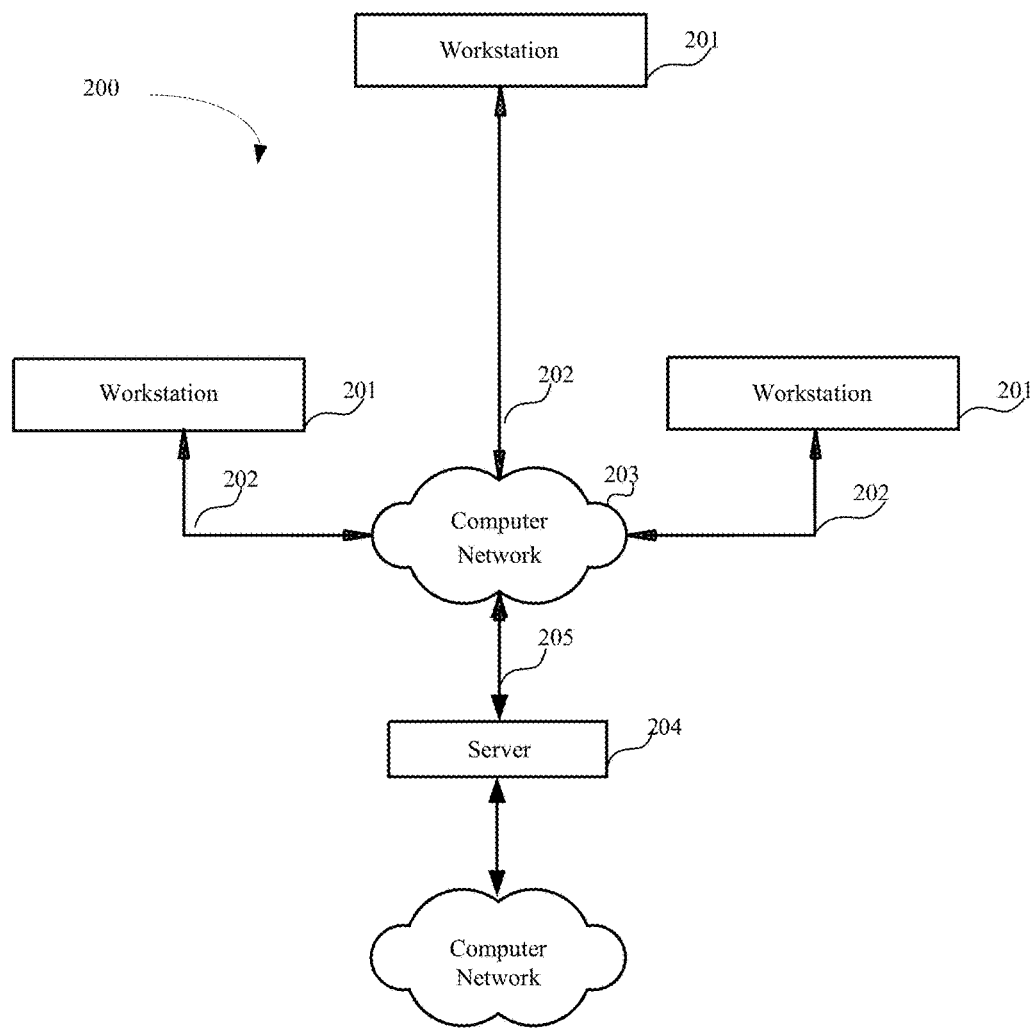
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
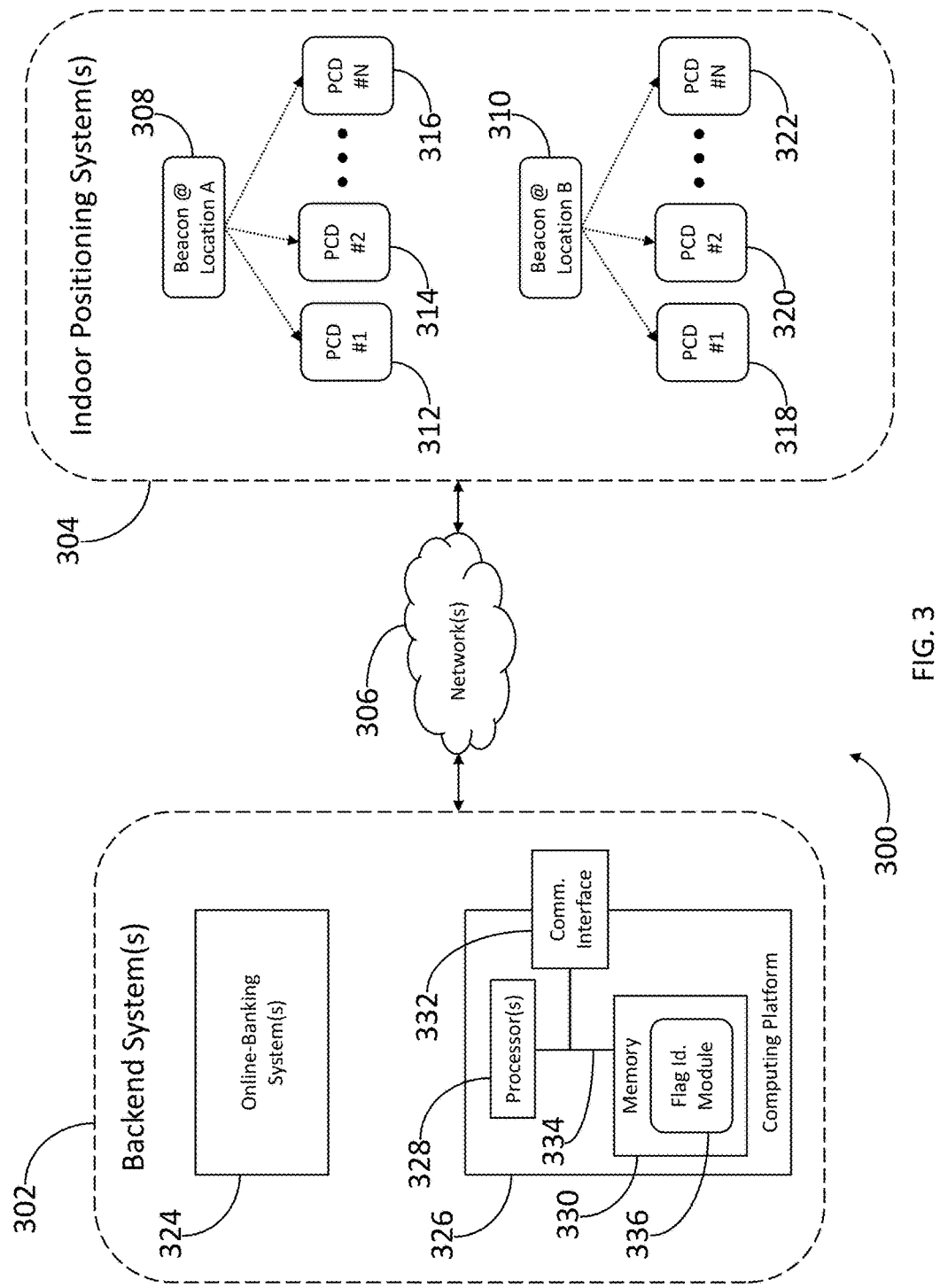
FIG. 3 depicts an illustrative computing environment for generating customer alerts based on indoor positioning system detection of physical customer presence in accordance with one or more example embodiments.

FIG. 3 depicts an illustrative computing environment for generating customer alerts based on indoor positioning system detection of physical customer presence in accordance with one or more example embodiments. Referring to FIG. 3, computing environment 300 may include one or more computing systems. For example, computing environment 300 may include backend computing system(s) 302 and indoor positioning system(s) 304. As will be described in greater detail below, backend computing system(s) 302 and/or indoor positioning system(s) 304 may include one or more computing devices associated with an organization (e.g., a financial institution). Indoor positioning system(s) 304 may be located at a particular physical location associated with the organization (e.g., a physical banking center location of the financial institution). In some embodiments, backend computing system(s) 302 may be located at a different geographic location from indoor positioning system(s) 304 (e.g., a central processing facility associated with the financial institution). Computing environment 300 may also include one or more networks. For example, computing environment 300 may include network(s) 306. Network(s) 306 may interconnect one or more computing devices of backend computing system(s) 302, and/or one or more computing devices of indoor positioning system(s) 304, and may include one or more sub-networks (e.g., LANs, WANs, or the like).

Indoor positioning system(s) 304 may include one or more location beacons configured to emit or broadcast a signal (e.g., a Bluetooth Low Energy signal, a Bluetooth Smart signal, a low-power radio signal, or the like) comprising an identifier associated with its physical location (e.g., a physical banking center location of the financial institution and/or a location within the physical banking center location of the financial institution). For example, indoor positioning system(s) 304 may include location beacon 308 and location beacon 310. Location beacon 308 may be configured to emit a signal comprising an identifier associated with its physical location (e.g., Location "A"), for example, an identifier associated with the physical banking center location of the financial institution and/or a location within the physical banking center location of the financial institution (e.g., an area associated with one or more human tellers, an area associated with one or more automated teller machines, an area associated with one or more loan officers, an area associated with one or more financial planners, an area associated with one or more customer service professionals, an area associated with an indoor lobby, an area associated with an outdoor lobby, an area associated with a walk-up or drive-up window, or the like). Similarly, location beacon 310 may be configured to emit a signal comprising an identifier associated with its physical location (e.g., Location "B"), for example, an identifier associated with the physical banking center location of the financial institution and/or a different location within the physical banking center location of the financial institution. Indoor positioning system(s) 304 may also include one or more personal computing devices, which may be presently in the possession of individuals (e.g., customers and/or associates of the financial institution) located at indoor positioning system(s) 304's physical location. For example, indoor positioning system(s) 304 may include personal computing devices 312 and 314 through 316, and personal computing devices 318 and 320 through 322.

Personal computing devices 312 and 314 through 316, and/or personal computing devices 318 and 320 through 322 may be any type of computing device capable of detecting the signal(s) emitted or broadcast by location beacon 308 and/or location beacon 310, generating a messaging indicating detection of the signal(s), and communicating the message indicating detection of the signal(s) to one or more other computing devices. For example, personal computing devices 312 and 314 through 316, and/or personal computing devices 318 and 320 through 322 may include one or more laptop computers, tablet computers, smart phones, mobile devices, near field communication tags, or the like. As will be described in greater detail below, when located within a proximity (e.g., zero to one hundred meters) of location beacon 308 and/or location beacon 310, personal computing devices 312 and 314 through 316, and/or personal computing devices 318 and 320 through 322 may be configured to detect signal(s) emitted by location beacon 308 and/or location beacon 310. Responsive to detecting signal(s) emitted by location beacon 308 and/or location beacon 310, personal computing devices 312 and 314 through 316, and/or personal computing devices 318 and 320 through 322 may be configured to generate a message indicating detection of the signal(s), and communicate the message to one or more other computing devices (e.g., one or more computing devices of backend computing system(s) 302). As indicated above, the signal(s) emitted by location beacon 308 and/or location beacon 310 may comprise one or more identifiers associated with their respective locations (e.g., Location "A," Location "B," or the like), and the message(s) generated by personal computing devices 312 and 314 through 316, and/or personal computing devices 318 and 320 through 322 responsive to detection of the signal(s) may comprise the identifier(s) and/or information identified utilizing the identifier(s) (e.g., information associated with Location "A," Location "B," or the like). Additionally or alternatively, the message(s) generated by personal computing devices 312 and 314 through 316, and/or personal computing devices 318 and 320 through 322 responsive to detection of the signal(s) may comprise identifiers associated with an individual presently in possession of one or more of personal computing devices 312 and 314 through 316, and/or personal computing devices 318 and 320 through 322, for example, customer identifier(s), associate identifier(s), or the like.

Backend computing system(s) 302 may include one or more computing devices associated with the organization (e.g., the financial institution). For example, backend computing system(s) 302 may include online-banking system(s) 324 and computing platform 326. As will be described in greater detail below, online-banking system(s) 324 may include one or more computing devices (e.g., mainframes, servers, server blades, or the like) configured to maintain and/or support one or more online-banking services offered by the organization to its customers. Computing platform 326 may include one or more processor(s) 328, memory 330, communication interface 332, and data bus 334. Data bus 334 may interconnect processor(s) 328, memory 330, and/or communication interface 332. Communication interface 332 may be a network interface configured to support communications between computing platform 326 and network(s) 306, or one or more sub-networks thereof. Memory 330 may include one or more program modules comprising instructions that when executed by processor(s) 328 cause computing platform 326 to perform one or more functions described herein. For example, memory 330 may include flag identification module 336, which may comprise instructions that when executed by processor(s) 328 may cause computing platform 326 to perform one or more functions described herein.

Figure 4A:
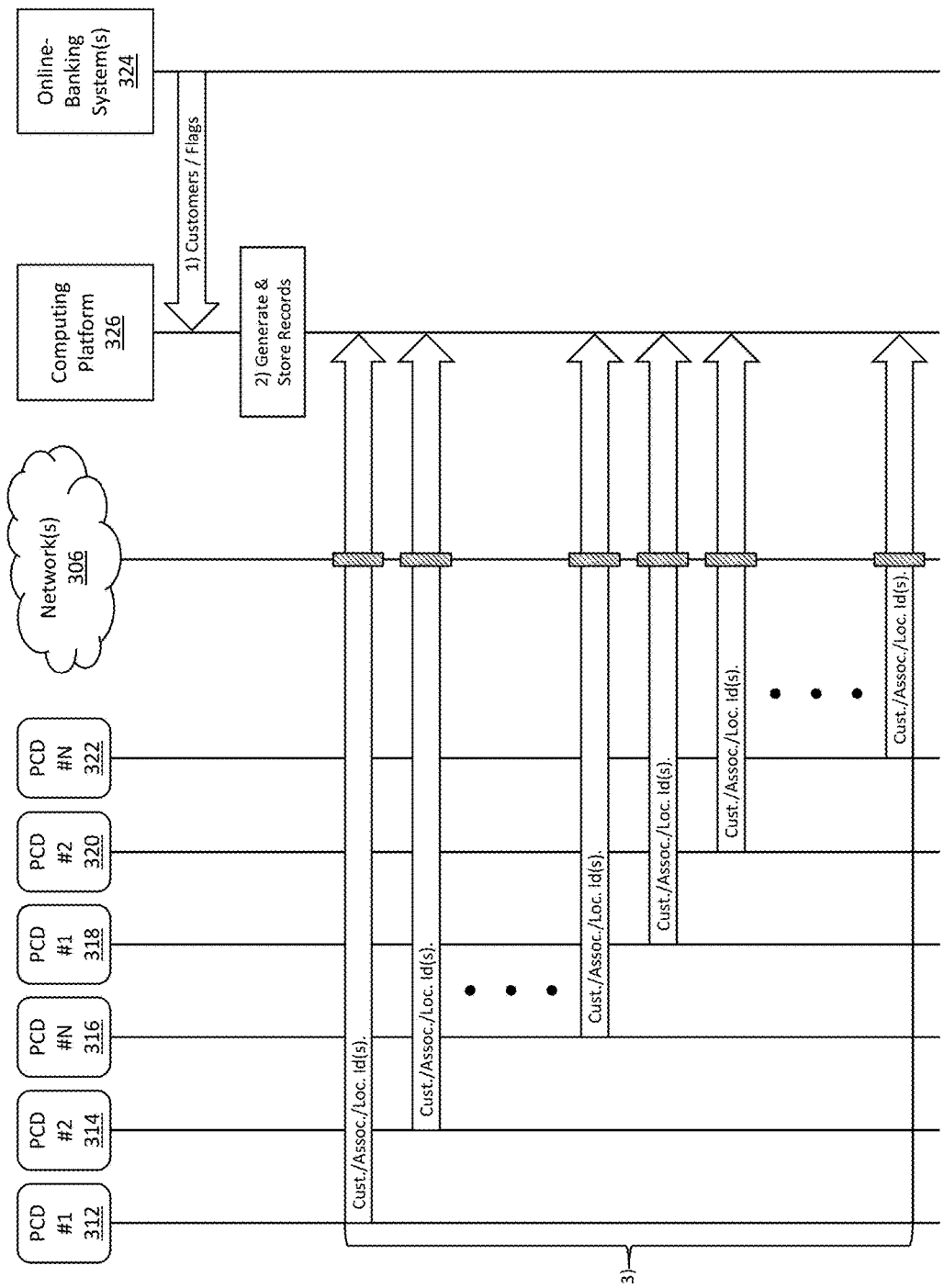
FIGS. 4A and 4B depict an illustrative event sequence for generating customer alerts based on indoor positioning system detection of physical customer presence in accordance with one or more example embodiments.
Figure 4B:
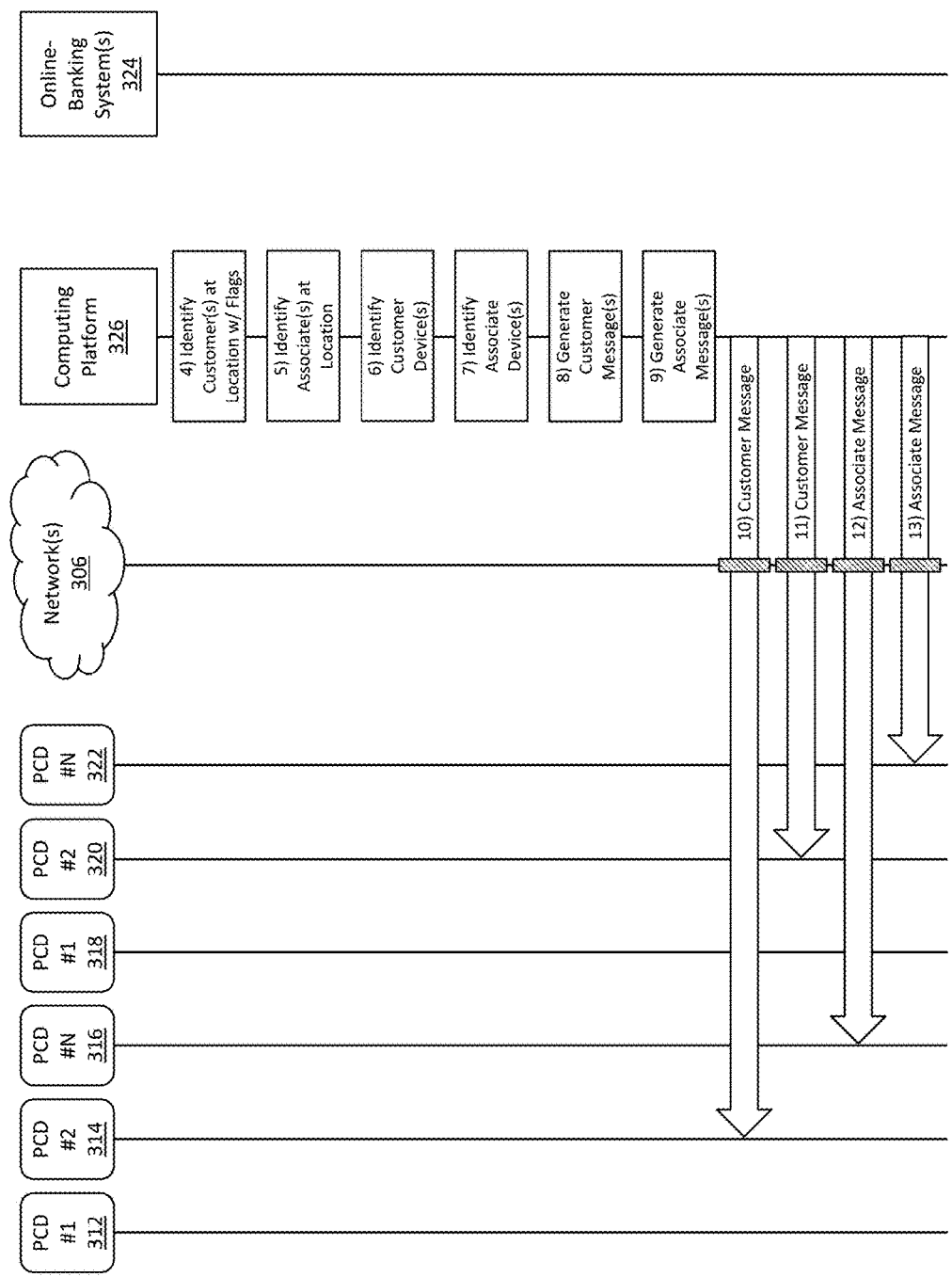

FIGS. 4A and 4B depict an illustrative event sequence for generating customer alerts based on indoor positioning system detection of physical customer presence in accordance with one or more example embodiments. Referring to FIG. 4A, at step 1, computing platform 326 may receive (e.g., via communication interface 332) one or more messages comprising data identifying a plurality of customers that have flagged items via online-banking system(s) 324, and one or more items that the customers have flagged via online-banking system(s) 324 from one or more computing devices of online-banking system(s) 324. For example, computing platform 326 may receive (e.g., via communication interface 332) one or more messages comprising data identifying a customer associated with personal computing device 314 and a customer associated with personal computing device 320, and indicating that the customer associated with personal computing device 314 has flagged one or more items via online-banking system(s) 324 and that the customer associated with personal computing device 320 has flagged one or more items via online-banking system(s) 324. The data may also identify the one or more items flagged by the customer associated with personal computing device 314 via online-banking system(s) 324 and the one or more items flagged by the customer associated with personal computing device 320 via online-banking system(s) 324. In some embodiments, the one or more items may include one or more fees incurred with the financial institution by the customer (e.g., the customer associated with personal computing device 314 and/or the customer associated with personal computing device 320) that the customer has flagged via online-banking system(s) 324. Additionally or alternatively, the one or more items may include one or more offers the financial institution has presented to the customer (e.g., the customer associated with personal computing device 314 and/or the customer associated with personal computing device 320) that the customer has flagged via online-banking system(s) 324.

At step 2, computing platform 326 may generate one or more records comprising the data identifying the plurality of customers that have flagged items via online-banking system(s) 324, and the item(s) that the customers have flagged via online-banking system(s) 324, and may store the record(s) comprising the data identifying the plurality of customers that have flagged items via online-banking system(s) 324, and the item(s) that the customers have flagged via online-banking system(s) 324 (e.g., in memory 330). For example, computing platform 326 may generate one or more records comprising the data identifying the customer associated with personal computing device 314 and the customer associated with personal computing device 320, indicating that the customer associated with personal computing device 314 has flagged the item(s) via online-banking system(s) 324 and that the customer associated with personal computing device 320 has flagged the item(s) via online-banking system(s) 324, and identifying the item(s) flagged by the customer associated with personal computing device 314 via online-banking system(s) 324 and the item(s) flagged by the customer associated with personal computing device 320 via online-banking system(s) 324, and may store the record(s) (e.g., in memory 330).

At step 3, computing platform 326 may receive (e.g., via communication interface 332 and network(s) 306) a plurality of messages comprising data indicating physical presence of individuals associated with an organization (e.g., customers and/or associates of a financial institution) at a physical location of the organization from indoor positioning system(s) 304 (e.g., an indoor positioning system located at a physical banking center location of the financial institution). For example, individuals (e.g., customers and/or associates of the financial institution) presently in possession of personal computing devices 312 and 314 through 316 may be located within a predetermined proximity of location beacon 308 (e.g., at Location "A"), and personal computing devices 312 and 314 through 316 may detect a signal emitted by location beacon 308 comprising an identifier associated with its location, and, responsive to detecting the signal, may generate and communicate to computing platform 326 (e.g., via network(s) 306) one or more messages indicating their physical presence within the proximity of location beacon 308. Similarly, individuals (e.g., customers and/or associates of the financial institution) presently in possession of personal computing devices 318 and 320 through 322 may be located within a predetermined proximity of location beacon 310 (e.g., at Location "B"), and personal computing devices 318 and 320 through 322 may detect a signal emitted by location beacon 310 comprising an identifier associated with its location, and, responsive to detecting the signal, may generate and communicate to computing platform 326 (e.g., via network(s) 306) one or more messages indicating their physical presence within the proximity of location beacon 310.

In some embodiments, each of the plurality of messages may include an identifier associated with the location (e.g., the identifier contained in the signal emitted by location beacon 308 and/or location beacon 310, information identified utilizing the identifier(s), or the like) and/or one or more identifiers associated with an individual (e.g., an associate or customer of the financial institution) presently in possession of the personal computing device that generated the message. For example, a message received from personal computing device 312 may comprise an identifier associated with Location "A" and/or an identifier associated with an individual presently in possession of personal computing device 312 (e.g., at Location "A"). Similarly, a message received from personal computing device 314 may comprise an identifier associated with Location "A" and/or an identifier associated with an individual presently in possession of personal computing device 314 (e.g., at Location "A"); a message received from personal computing device 316 may comprise an identifier associated with Location "A" and/or an identifier associated with an individual presently in possession of personal computing device 316 (e.g., at Location "A"); a message received from personal computing device 318 may comprise an identifier associated with Location "B" and/or an identifier associated with an individual presently in possession of personal computing device 318 (e.g., at Location "B"); a message received from personal computing device 320 may comprise an identifier associated with Location "B" and/or an identifier associated with an individual presently in possession of personal computing device 320 (e.g., at Location "B"); and a message received from personal computing device 322 may comprise an identifier associated with Location "B" and/or an identifier associated with an individual presently in possession of personal computing device 322 (e.g., at Location "B").

Referring to FIG. 4B, responsive to receiving the plurality of messages comprising the data indicating the physical presence of the customers of the organization at the physical location(s) of the organization associated with indoor positioning system(s) 304 (e.g., Location "A" and/or Location "B"), at step 4, computing platform 326 may identify at least one customer of the customers at the physical location(s) associated with indoor positioning system(s) 304 that has flagged one or more items via online-banking system(s) 324. For example, as indicated above, the message received from personal computing device 314 may include a customer identifier associated with the customer presently in possession of personal computing device 314 and the message received from personal computing device 320 may include a customer identifier associated with the customer presently in possession of personal computing device 320. Computing platform 326 may determine that the customer presently in possession of personal computing device 314 and the customer presently in possession of personal computing device 320 have flagged one or more items via online-banking system(s) 324 by identifying (e.g., utilizing the customer identifiers), from amongst the record(s) comprising the data identifying the customer associated with personal computing device 314 and the customer associated with personal computing device 320 (e.g., the record(s) generated and stored in step 2 above) data indicating that the customer associated with personal computing device 314 has flagged the item(s) via online-banking system(s) 324 and that the customer associated with personal computing device 320 has flagged the item(s) via online-banking system(s) 324, and identifying the item(s) flagged by the customer associated with personal computing device 314 via online-banking system(s) 324 and the item(s) flagged by the customer associated with personal computing device 320 via online-banking system(s) 324.

At step 5, computing platform 326 may identify one or more associates at the location(s) associated with indoor positioning system(s) 304 to assist the customer(s) at the location(s) associated with indoor positioning system(s) 304 that have flagged item(s) via online-banking system(s) 324. For example, computing platform 326 may identify (e.g., based on the message received from personal computing device 316 in step 3 above) an associate presently in possession of personal computing device 316 (e.g., at Location "A") to assist the customer presently in possession of personal computing device 314 (e.g., at Location "A"). Similarly, computing platform 326 may identify (e.g., based on the message received from personal computing device 322 in step 3 above) an associate presently in possession of personal computing device 322 (e.g., at Location "B") to assist the customer presently in possession of personal computing device 320 (e.g., at Location "B"). At step 6, computing platform 326 may identify one or more personal computing devices presently in possession of the customer(s) at the location(s) associated with indoor positioning system(s) 304 that have flagged item(s) via online-banking system(s) 324. For example, computing platform 326 may identify personal computing device 314 (e.g., based on the message received from personal computing device 314 in step 3 above). Similarly, computing platform 326 may identify personal computing device 320 (e.g., based on the message received from personal computing device 320 in step 3 above). At step 7, computing platform 326 may identify one or more personal computing devices presently in possession of the associate(s) at the location(s) associated with indoor positioning system(s) 304 identified to assist the customer(s) at the location(s) associated with indoor positioning system(s) 304 that have flagged item(s) via online-banking system(s) 324. For example, computing platform 326 may identify personal computing device 316 (e.g., based on the message received from personal computing device 316 in step 3 above). Similarly, computing platform 326 may identify personal computing device 322 (e.g., based on the message received from personal computing device 322 in step 3 above).

Figure 5:
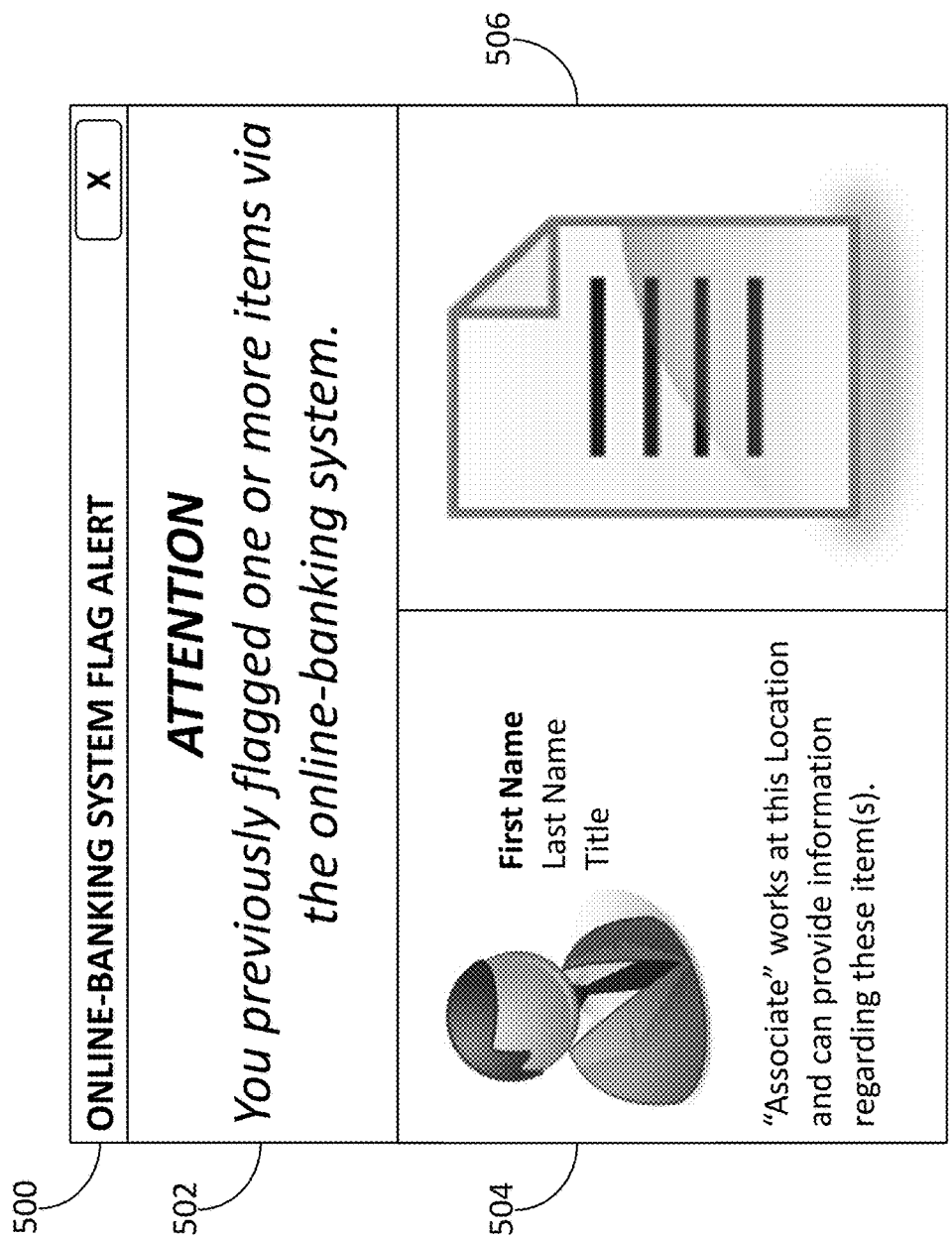
FIG. 5 depicts an example customer message for generating customer alerts based on indoor positioning system detection of physical customer presence in accordance with one or more example embodiments.

At step 8, computing platform 326 may generate one or more customer messages indicating that the customer(s) at the location(s) associated with indoor positioning system(s) 304 have flagged the item(s) via online-banking system(s) 324. For example, computing platform 326 may generate a customer message indicating that the customer associated with personal computing device 314 has flagged the item(s) via online-banking system(s) 324. Similarly, computing platform 326 may generate a customer message indicating that the customer associated with personal computing device 320 has flagged the item(s) via online-banking system(s) 324. FIG. 5 depicts an example customer message for generating customer alerts based on indoor positioning system detection of physical customer presence in accordance with one or more example embodiments. Referring to FIG. 5, message 500 may include indication 502, indicating that the customer (e.g., the customer presently in possession of personal computing device 314 or the customer presently in possession of personal computing device 320) has flagged the item(s) via online-banking system(s) 324. Message 500 may also include section 504, which may identify an associate of the organization currently located at the physical location (e.g., the associate presently in possession of personal computing device 316 or the associate presently in possession of personal computing device 322) that has been identified to assist the customer that has flagged the item(s) via online-banking system(s) 324. Message 500 may also include section 506, which may include information regarding the item(s) the customer has flagged via online-banking system(s) 324.

Figure 6:
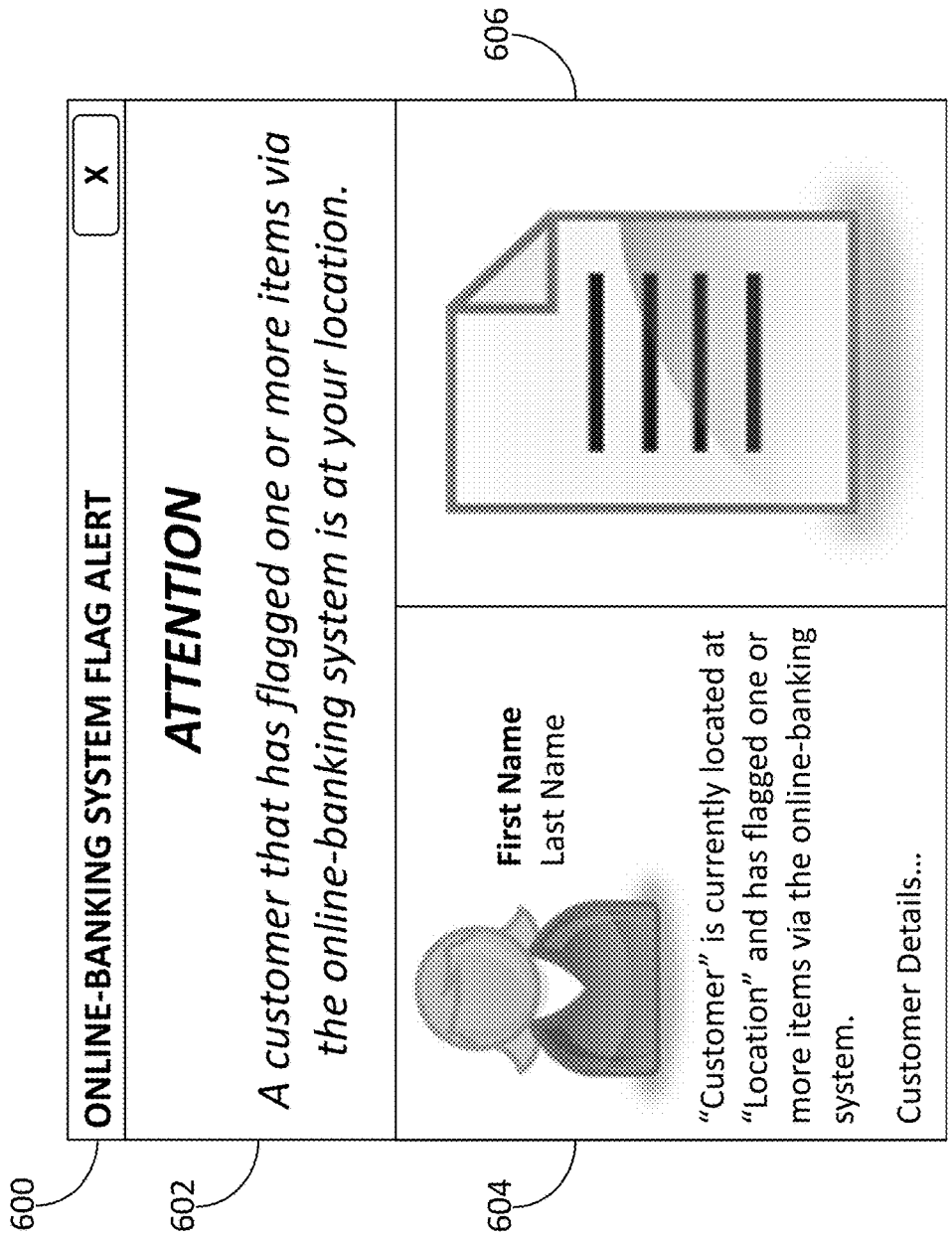
FIG. 6 depicts an example associate message for generating customer alerts based on indoor positioning system detection of physical customer presence in accordance with one or more example embodiments.

Returning to FIG. 4B, at step 9, computing platform 326 may generate one or more associate messages indicating that the customer(s) at the location(s) associated with indoor positioning system(s) 304 have flagged the item(s) via online-banking system(s) 324. For example, computing platform 326 may generate an associate message indicating that the customer associated with personal computing device 314 has flagged the item(s) via online-banking system(s) 324. Similarly, computing platform 326 may generate an associate message indicating that the customer associated with personal computing device 320 has flagged the item(s) via online-banking system(s) 324. FIG. 6 depicts an example associate message for generating customer alerts based on indoor positioning system detection of physical customer presence in accordance with one or more example embodiments.

Referring to FIG. 6, message 600 may include indication 602, indicating that the customer (e.g., the customer presently in possession of personal computing device 314 and/or the customer presently in possession of personal computing device 320) has flagged the item(s) via online-banking system(s) 324. Message 600 may also include section 604, which may identify the customer of the organization currently located at the physical location (e.g., the customer presently in possession of personal computing device 314 and/or the customer presently in possession of personal computing device 320) that has flagged the item(s) via online-banking system(s) 324, and/or the location of the customer that has flagged the item(s) via online-banking system(s) 324 within the location(s) associated with indoor positioning system(s) 304 (e.g., Location "A" or Location "B"). Message 600 may also include section 606, which may include information regarding the item(s) the customer has flagged via online-banking system(s) 324.

Returning to FIG. 4B, at step 10, computing platform 326 may communicate (e.g., via communication interface 332 and network(s) 306) the customer message indicating that the customer associated with personal computing device 314 has flagged the item(s) via online-banking system(s) 324 to personal computing device 314. At step 11, computing platform 326 may communicate (e.g., via communication interface 332 and network(s) 306) the customer message indicating that the customer associated with personal computing device 320 has flagged the item(s) via online-banking system(s) 324 to personal computing device 320. At step 12, computing platform 326 may communicate (e.g., via communication interface 332 and network(s) 306) the associate message indicating that the customer associated with personal computing device 314 has flagged the item(s) via online-banking system(s) 324 to personal computing device 316. At step 13, computing platform 326 may communicate (e.g., via communication interface 332 and network(s) 306) the associate message indicating that the customer associated with personal computing device 320 has flagged the item(s) via online-banking system(s) 324 to personal computing device 322.

Figure 7:
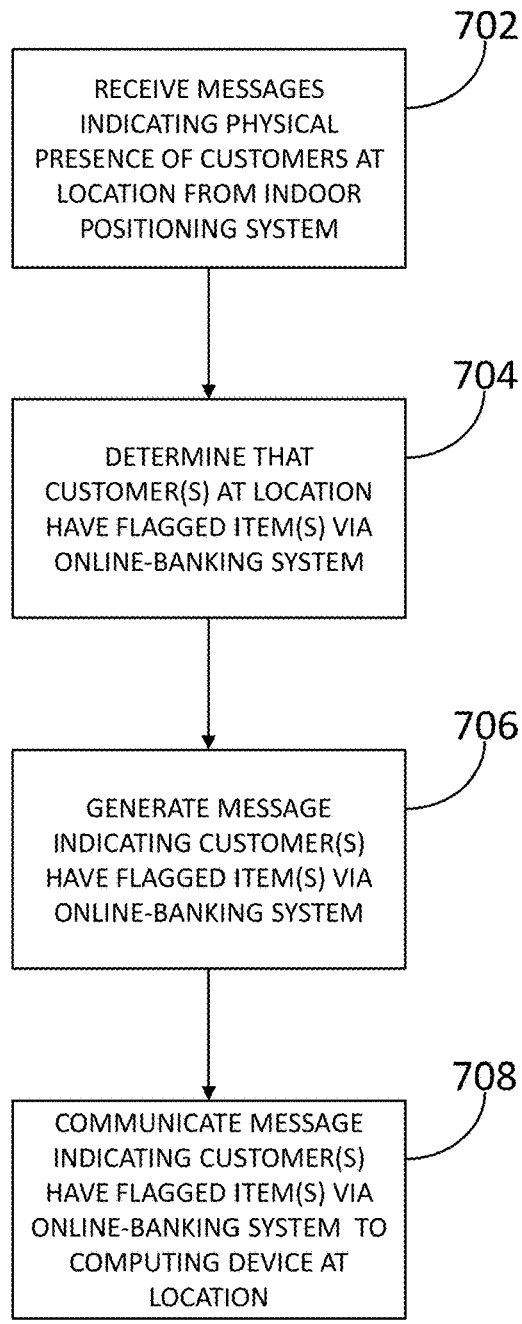
FIG. 7 depicts an illustrative method for generating customer alerts based on indoor positioning system detection of physical customer presence in accordance with one or more example embodiments.

FIG. 7 depicts an illustrative method for generating customer alerts based on indoor positioning system detection of physical customer presence in accordance with one or more example embodiments. Referring to FIG. 7, at step 702, a computing platform may receive a plurality of messages comprising data indicating physical presence of customers at a physical location from an indoor positioning system located at the physical location. For example, computing platform 326 may receive, from indoor positioning system(s) 304, messages indicating physical presence of a customer presently in possession of personal computing device 312 at a location associated with indoor positioning system(s) 304 (e.g., Location "A"), a customer presently in possession of personal computing device 314 at a location associated with indoor positioning system(s) 304 (e.g., Location "A"), a customer presently in possession of personal computing device 318 at a location associated with indoor positioning system(s) 304 (e.g., Location "B"), and a customer presently in possession of personal computing device 320 at a location associated with indoor positioning system(s) 304 (e.g., Location "B"). Responsive to receiving the plurality of messages comprising the data indicating the physical presence of the customers at the physical location, at step 704, the computing platform may determine that at least one customer of the customers at the physical location has flagged one or more items via an online-banking system. For example, computing platform 326 may determine that the customer presently in possession of personal computing device 314 has flagged one or more items via online-banking system(s) 324, and/or that the customer presently in possession of personal computing device 320 has flagged one or more items via online-banking system(s) 324.

Responsive to determining that the at least one customer of the customers at the physical location has flagged the item(s) via the online-banking system, at step 706, the computing platform may generate a message indicating that the customer(s) at the physical location have flagged the item(s) via the online-banking system. For example, computing platform 326 may generate a message indicating that the customer presently in possession of personal computing device 314 has flagged the item(s) via online-banking system(s) 324, and/or a message indicating that the customer presently in possession of personal computing device 320 has flagged the item(s) via online-banking system(s) 324. At step 708, the computing platform may communicate the message indicating that the customer(s) at the physical location have flagged the item(s) via the online-banking system to a computing device located at the physical location. For example, computing platform 326 may communicate the message indicating that the customer presently in possession of personal computing device 314 has flagged the item(s) via online-banking system(s) 324 to personal computing device 314, and/or may communicate the message indicating that the customer presently in possession of personal computing device 320 has flagged the item(s) via online-banking system(s) 324 to personal computing device 320.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
at a computing platform comprising at least one processor, a memory, and a communication interface:
  receiving, via the communication interface and from an indoor positioning system located at a physical banking center location of a financial institution, a plurality of messages comprising data indicating physical presence of customers of the financial institution at the physical banking center location of the financial institution;
  responsive to receiving the plurality of messages comprising the data indicating the physical presence of the customers of the financial institution at the physical banking center location of the financial institution, determining, by the at least one processor, that at least one customer of the customers of the financial institution at the physical banking center location of the financial institution has flagged one or more items via an online-banking system of the financial institution;

receiving, via the communication interface and from the indoor positioning system located at the physical banking center location of the financial institution, a plurality of messages comprising data indicating physical presence of associates of the financial institution at the physical banking center location of the financial institution;

identifying, by the at least one processor and based on the data indicating the physical presence of the associates of the financial institution at the physical banking center location of the financial institution, one or more associates of the associates of the financial institution at the physical banking center location of the financial institution to assist the at least one customer of the customers of the financial institution at the physical banking center location of the financial institution;

identifying, by the at least one processor and based on at least one of the plurality of messages comprising the data indicating the physical presence of the associates of the financial institution at the physical banking center location of the financial institution, one or more personal computing devices presently in possession of the one or more associates of the associates of the financial institution at the physical banking center location of the financial institution;

generating, by the at least one processor, one or more messages indicating that the at least one customer of the customers of the financial institution at the physical banking center location of the financial institution has flagged the one or more items via the online-banking system of the financial institution; and communicating, via the communication interface and to the one or more personal computing devices presently in possession of the one or more associates of the associates of the financial institution at the physical banking center location of the financial institution, the one or more messages indicating that the at least one customer of the customers of the financial institution at the physical banking center location of the financial institution has flagged the one or more items via the online-banking system of the financial institution, wherein the indoor positioning system comprises a plurality of personal computing devices presently in possession of the customers of the financial institution at the physical banking center location of the financial institution, and at least one location beacon that is located at the physical banking center location of the financial institution and configured to emit a signal comprising an identifier associated with the physical banking center location, wherein receiving the plurality of messages comprising data indicating the physical presence of the customers of the financial institution at the physical banking center location of the financial institution comprises receiving, from the plurality of personal computing devices, data comprising the identifier associated with the physical banking center location, and wherein the indoor positioning system comprises a first location beacon that is located at a first location of the physical banking center location of the financial institution and configured to emit a signal comprising an identifier associated with the first location of the physical banking center location of the financial institution, and a second location beacon that is located at a second location of the physical banking center location of the financial institution and configured to emit a signal comprising an identifier associated with the second location of the physical banking center location of the financial institution, and wherein receiving the plurality of messages comprising data indicating physical presence of the customers of the financial institution at the physical banking center location of the financial institution comprises:

receiving first messages comprising data indicating physical presence of a portion of the customers of the financial institution at the first location of the physical banking center location of the financial institution; and receiving second messages comprising data indicating physical presence of a portion of the customers of the financial institution at the second location of the physical banking center location of the financial institution.

2. The method of claim 1, comprising:

generating, by the at least one processor, a message indicating that the at least one customer of the customers of the financial institution at the physical banking center location of the financial institution has flagged the one or more items via the online-banking system of the financial institution;

identifying, by the at least one processor, at least one computing device located at the physical banking center location of the financial institution; and communicating, via the communication interface and to the at least one computing device located at the physical banking center location of the financial institution, the message indicating that the at least one customer of the customers of the financial institution at the physical banking center location of the financial institution has flagged the one or more items via the online-banking system of the financial institution.

3. The method of claim 1, comprising:

receiving, via the communication interface and from the online-banking system of the financial institution, one or more messages comprising data identifying a plurality of customers of the financial institution that have flagged items via the online-banking system of the financial institution, and one or more items that the customers of the financial institution have flagged via the online-banking system of the financial institution;

generating, by the at least one processor, one or more records comprising the data identifying the plurality of customers of the financial institution that have flagged items via the online-banking system of the financial institution, and the one or more items that the customers of the financial institution have flagged via the online-banking system of the financial institution; and storing, by the at least one processor and in the memory, the one or more records comprising the data identifying the plurality of customers of the financial institution that have flagged items via the online-banking system of the financial institution, and the one or more items that the customers of the financial institution have flagged via the online-banking system of the financial institution.

4. The method of claim 3, wherein determining that the at least one customer of the customers of the financial institution at the physical banking center location of the financial institution has flagged one or more items via the online-banking system of the financial institution comprises:

identifying, by the at least one processor and from amongst the plurality of customers of the financial institution that have flagged items via the online-banking system of the financial institution, the at least one customer of the customers of the financial institution at the physical banking center location of the financial institution; and identifying, by the at least one processor and from amongst the one or more items that the customers of the financial institution have flagged via the online-banking system of the financial institution, one or more items that the at least one customer of the customers of the financial institution at the physical banking center location of the financial institution has flagged via the online-banking system of the financial institution.

5. The method of claim 1, comprising identifying, by the at least one processor and based on at least one of the plurality of messages comprising the data indicating the physical presence of the customers of the financial institution at the physical banking center location of the financial institution, one or more personal computing devices presently in possession of the at least one customer of the customers of the financial institution at the physical banking center location of the financial institution.

6. The method of claim 5, comprising:
generating, by the at least one processor, one or more third messages indicating that the at least one customer of the customers of the financial institution at the physical banking center location of the financial institution has flagged the one or more items via the online-banking system of the financial institution; and
communicating, via the communication interface and to the one or more personal computing devices presently in possession of the at least one customer of the customers of the financial institution at the physical banking center location of the financial institution, the one or more third messages indicating that the at least one customer of the customers of the financial institution at the physical banking center location of the financial institution has flagged the one or more items via the online-banking system of the financial institution.

7. The method of claim 1, wherein the one or more items comprise one or more offers the financial institution has presented to the at least one customer of the customers of the financial institution at the physical banking center location of the financial institution that the at least one customer of the customers of the financial institution at the physical banking center location of the financial institution has flagged via the online-banking system of the financial institution, and wherein determining that the at least one customer of the customers of the financial institution at the physical banking center location of the financial institution has flagged the one or more items via the online-banking system of the financial institution comprises determining, by the at least one processor, that the at least one customer of the customers of the financial institution at the physical banking center location of the financial institution has flagged the one or more offers the financial institution has presented to the at least one customer of the customers of the financial institution at the physical banking center location of the financial institution via the online-banking system of the financial institution.

8. The method of claim 1, wherein the plurality of messages comprising data indicating the physical presence of the customers of the financial institution at the physical banking center location of the financial institution comprises a plurality of customer identifiers, each customer identifier of the plurality of customer identifiers identifying a customer of the customers of the financial institution at the physical banking center location of the financial institution.

9. The method of claim 8, wherein determining that the at least one customer of the customers of the financial institution at the physical banking center location of the financial institution has flagged the one or more items via the online-banking system of the financial institution comprises determining, by the at least one processor and based on at least one of the plurality of customer identifiers that corresponds to the at least one customer of the customers of the financial institution at the physical banking center location of the financial institution, that the at least one customer of the customers of the financial institution at the physical banking center location of the financial institution has flagged one or more items via the online-banking system of the financial institution.

10. The method of claim 1, wherein determining that the at least one customer of the customers of the financial institution at the physical banking center location of the financial institution has flagged the one or more items via the online-banking system of the financial institution comprises:
determining, by the at least one processor, that a customer of the portion of the customers of the financial institution at the first location of the physical banking center location of the financial institution has flagged one or more items via the online-banking system of the financial institution; and
determining, by the at least one processor, that a customer of the portion of the customers of the financial institution at the second location of the physical banking center location of the financial institution has flagged one or more items via the online-banking system of the financial institution.

11. The method of claim 10, comprising:
generating, by the at least one processor, a message indicating that the customer of the portion of the customers of the financial institution at the first location of the physical banking center location of the financial institution has flagged one or more items via the online-banking system of the financial institution; and
generating, by the at least one processor, a message indicating that the customer of the portion of the customers of the financial institution at the second location of the physical banking center location of the financial institution has flagged one or more items via the online-banking system of the financial institution.

12. The method of claim 11, comprising:
identifying, by the at least one processor and based on the first messages comprising data indicating physical presence of the portion of the customers of the financial institution at the first location of the physical banking center location of the financial institution, a personal computing device presently in possession of the customer of the portion of the customers of the financial institution at the first location of the physical banking center location of the financial institution;
identifying, by the at least one processor and based on the second messages comprising data indicating physical presence of the portion of the customers of the financial institution at the second location of the physical banking center location of the financial institution, a personal computing device presently in possession of the customer of the portion of the customers of the financial institution at the second location of the physical banking center location of the financial institution;
communicating, via the communication interface and to the personal computing device presently in possession of the customer of the portion of the customers of the financial institution at the first location of the physical banking center location of the financial institution, the message indicating that the customer of the portion of the customers of the financial institution at the first location of the physical banking center location of the financial institution has flagged one or more items via the online-banking system of the financial institution; and communicating, via the communication interface and to the personal computing device presently in possession of the customer of the portion of the customers of the financial institution at the second location of the physical banking center location of the financial institution, the message indicating that the customer of the portion of the customers of the financial institution at the second location of the physical banking center location of the financial institution has flagged one or more items via the online-banking system of the financial institution.

13. A system, comprising:

an indoor positioning system located at a physical banking center location of a financial institution; and a computing platform comprising at least one processor, a memory, and a communication interface, wherein the memory stores instructions that, when executed by the at least one processor, cause the computing platform to:

receive, via the communication interface and from the indoor positioning system located at the physical banking center location of the financial institution, a plurality of messages comprising data indicating physical presence of customers of the financial institution at the physical banking center location of the financial institution;

responsive to receiving the plurality of messages comprising the data indicating the physical presence of the customers of the financial institution at the physical banking center location of the financial institution, determine, by the at least one processor, that at least one customer of the customers of the financial institution at the physical banking center location of the financial institution has flagged one or more items via an online-banking system of the financial institution;

receive, via the communication interface and from the indoor positioning system located at the physical banking center location of the financial institution, a plurality of messages comprising data indicating physical presence of associates of the financial institution at the physical banking center location of the financial institution;

identify, by the at least one processor and based on the data indicating the physical presence of the associates of the financial institution at the physical banking center location of the financial institution, one or more associates of the associates of the financial institution at the physical banking center location of the financial institution to assist the at least one customer of the customers of the financial institution at the physical banking center location of the financial institution;

identify, by the at least one processor and based on at least one of the plurality of messages comprising the data indicating the physical presence of the associates of the financial institution at the physical banking center location of the financial institution, one or more personal computing devices presently in possession of the one or more associates of the associates of the financial institution at the physical banking center location of the financial institution;

generate, by the at least one processor, one or more messages indicating that the at least one customer of the customers of the financial institution at the physical banking center location of the financial institution has flagged the one or more items via the online-banking system of the financial institution; and communicate, via the communication interface and to the one or more personal computing devices presently in possession of the one or more associates of the associates of the financial institution at the physical banking center location of the financial institution, the one or more messages indicating that the at least one customer of the customers of the financial institution at the physical banking center location of the financial institution has flagged the one or more items via the online-banking system of the financial institution, wherein the indoor positioning system comprises a plurality of personal computing devices presently in possession of the customers of the financial institution at the physical banking center location of the financial institution, and at least one location beacon that is located at the physical banking center location of the financial institution and configured to emit a signal comprising an identifier associated with the physical banking center location, wherein receiving the plurality of messages comprising data indicating the physical presence of the customers of the financial institution at the physical banking center location of the financial institution comprises receiving, from the plurality of personal computing devices, data comprising the identifier associated with the physical banking center location, and wherein the indoor positioning system comprises a first location beacon that is located at a first location of the physical banking center location of the financial institution and configured to emit a signal comprising an identifier associated with the first location of the physical banking center location of the financial institution, and a second location beacon that is located at a second location of the physical banking center location of the financial institution and configured to emit a signal comprising an identifier associated with the second location of the physical banking center location of the financial institution, and wherein receiving the plurality of messages comprising data indicating physical presence of the customers of the financial institution at the physical banking center location of the financial institution comprises:

receiving first messages comprising data indicating physical presence of a portion of the customers of the financial institution at the first location of the physical banking center location of the financial institution; and receiving second messages comprising data indicating physical presence of a portion of the customers of the financial institution at the second location of the physical banking center location of the financial institution.

14. One or more non-transitory computer-readable media having instructions stored thereon that, when executed by a computing platform comprising at least one processor and a memory and a communication interface, cause the computing platform to:

receive, via the communication interface and from an indoor positioning system located at a physical banking center location of a financial institution, a plurality of messages comprising data indicating physical presence of customers of the financial institution at the physical banking center location of the financial institution;

responsive to receiving the plurality of messages comprising the data indicating the physical presence of the customers of the financial institution at the physical banking center location of the financial institution, determine, by the at least one processor, that at least one customer of the customers of the financial institution at the physical banking center location of the financial institution has flagged one or more items via an online-banking system of the financial institution;

receive, via the communication interface and from the indoor positioning system located at the physical banking center location of the financial institution, a plurality of messages comprising data indicating physical presence of associates of the financial institution at the physical banking center location of the financial institution;

identify, by the at least one processor and based on the data indicating the physical presence of the associates of the financial institution at the physical banking center location of the financial institution, one or more associates of the associates of the financial institution at the physical banking center location of the financial institution to assist the at least one customer of the customers of the financial institution at the physical banking center location of the financial institution;

identify, by the at least one processor and based on at least one of the plurality of messages comprising the data indicating the physical presence of the associates of the financial institution at the physical banking center location of the financial institution, one or more personal computing devices presently in possession of the one or more associates of the associates of the financial institution at the physical banking center location of the financial institution;

generate, by the at least one processor, one or more messages indicating that the at least one customer of the customers of the financial institution at the physical banking center location of the financial institution has flagged the one or more items via the online-banking system of the financial institution; and communicate, via the communication interface and to the one or more personal computing devices presently in possession of the one or more associates of the associates of the financial institution at the physical banking center location of the financial institution, the one or more messages indicating that the at least one customer of the customers of the financial institution at the physical banking center location of the financial institution has flagged the one or more items via the online-banking system of the financial institution, wherein the indoor positioning system comprises a plurality of personal computing devices presently in possession of the customers of the financial institution at the physical banking center location of the financial institution, and at least one location beacon that is located at the physical banking center location of the financial institution and configured to emit a signal comprising an identifier associated with the physical banking center location, wherein receiving the plurality of messages comprising data indicating the physical presence of the customers of the financial institution at the physical banking center location of the financial institution comprises receiving, from the plurality of personal computing devices, data comprising the identifier associated with the physical banking center location, and wherein the indoor positioning system comprises a first location beacon that is located at a first location of the physical banking center location of the financial institution and configured to emit a signal comprising an identifier associated with the first location of the physical banking center location of the financial institution, and a second location beacon that is located at a second location of the physical banking center location of the financial institution and configured to emit a signal comprising an identifier associated with the second location of the physical banking center location of the financial institution, and wherein receiving the plurality of messages comprising data indicating physical presence of the customers of the financial institution at the physical banking center location of the financial institution comprises:

receiving first messages comprising data indicating physical presence of a portion of the customers of the financial institution at the first location of the physical banking center location of the financial institution; and receiving second messages comprising data indicating physical presence of a portion of the customers of the financial institution at the second location of the physical banking center location of the financial institution.

* * * * *